(12) United States Patent
McKinzie et al.

(10) Patent No.: US 9,506,553 B2
(45) Date of Patent: Nov. 29, 2016

(54) COMPOSITE SHAFT WITH CORE INSERT

(71) Applicant: DEERE & COMPANY, Moline, IL (US)

(72) Inventors: Kyle K. McKinzie, Altamont, KS (US); Alfred S. Smemo, Dubuque, IA (US); Galen R. Love, Cherryvale, KS (US)

(73) Assignee: Deere & Company, Moline, IL (US)

( * ) Notice: Subject to any disclaimer, the term of this patent is extended or adjusted under 35 U.S.C. 154(b) by 174 days.

(21) Appl. No.: 14/194,034

(22) Filed: Feb. 28, 2014

(65) Prior Publication Data

US 2015/0247566 A1 Sep. 3, 2015

(51) Int. Cl.
  F16L 9/18 (2006.01)
  F16H 57/04 (2010.01)
  F16H 57/08 (2006.01)

(52) U.S. Cl.
  CPC ........ F16H 57/043 (2013.01); F16H 57/0479 (2013.01); F16H 57/0482 (2013.01); F16H 57/082 (2013.01)

(58) Field of Classification Search
  CPC ............. F16H 57/043; F16H 57/0426; F16H 57/0479
  USPC .................... 138/114, 140; 475/159; 74/467; 184/6.12
  See application file for complete search history.

(56) References Cited

U.S. PATENT DOCUMENTS

| | | | | |
|---|---|---|---|---|
| 3,937,300 | A * | 2/1976 | Avery | F16D 1/06 184/6.12 |
| 4,222,283 | A * | 9/1980 | Nagy | F16H 3/089 184/11.2 |
| 4,819,755 | A * | 4/1989 | Smemo | F16C 3/03 180/235 |
| 5,597,370 | A | 1/1997 | Nogle | |
| 9,188,215 | B2 * | 11/2015 | Tage | F16H 57/0426 |
| 2003/0060289 | A1 | 3/2003 | Nichols | |
| 2005/0050985 | A1 | 3/2005 | Crissy | |
| 2006/0191746 | A1 * | 8/2006 | Diosi | F16C 3/02 184/6.18 |
| 2007/0021224 | A1 | 1/2007 | Patrascu | |
| 2009/0123318 | A1 | 5/2009 | Poskie et al. | |
| 2009/0159370 | A1 * | 6/2009 | Maners | F16H 57/043 184/6.12 |
| 2014/0000395 | A1 * | 1/2014 | Schwarzbach | F16H 25/12 74/89.44 |

FOREIGN PATENT DOCUMENTS

| | | |
|---|---|---|
| DE | 19510762 A1 | 1/1996 |
| DE | 19727360 A1 | 9/1998 |
| DE | 19837091 | 2/2000 |
| DE | 10333432 A1 | 2/2005 |
| JP | H0814369 A | 1/1996 |

(Continued)

OTHER PUBLICATIONS

German Patent and Trade Mark Office, Search Report for German Patent Application No. 10 2015 202 443.1 mailed Oct. 2, 2015.

Primary Examiner — Kevin P Shaver
Assistant Examiner — Vishal Pancholi
(74) Attorney, Agent, or Firm — Lorenz & Kopf, LLP

(57) ABSTRACT

The disclosure provides an improved shaft design. The design includes an elongated annular shaft body, having an outer surface and defining a hollow cavity, and a core insert disposed in the hollow cavity. The shaft body has one or more radial flow ports that align with at least one fluid conduit in the insert. A pin couples the insert to the shaft body to prevent rotation of the insert relative to the shaft body. The shaft and the insert can be of different materials, for example, such that the density of the insert is less than that of the shaft body.

10 Claims, 4 Drawing Sheets

(56) References Cited

FOREIGN PATENT DOCUMENTS

| JP | 2004156674 | 6/2004 |
|---|---|---|
| JP | 2008051200 | 3/2008 |
| JP | 2015137313 A | 7/2015 |
| WO | 2013179591 A1 | 12/2013 |
| WO | 2014015253 A1 | 1/2014 |

* cited by examiner

COMPOSITE SHAFT WITH CORE INSERT

CROSS-REFERENCE TO RELATED APPLICATION(S)

Not Applicable.

STATEMENT REGARDING FEDERALLY SPONSORED RESEARCH

Not Applicable.

FIELD OF THE DISCLOSURE

This disclosure relates to the design of shafts, and more particularly to an improved shaft having a hollow construction and a core insert.

BACKGROUND OF THE DISCLOSURE

Shafts, such as rotary or drive shafts, are commonly employed for transmitting power from a rotational power source, such as the output shaft of a vehicle transmission, to a rotatably driven mechanism, such as a differential assembly. Oftentimes in power transmission shaft design, shafts are sized such that the material near the center of the shaft provides little benefit in terms of strength. If this is the case, some shafts can be made to be hollow, for example, to reduce weight or material costs. However, in many cases it may be useful to provide conduits for routing fluids such as cooling oil and lubricants within the shaft. When this is the case, typically the shaft designer must leave a suitable amount of material in the center of the shaft to provide for such conduits. As a result, the cost and labor involved in machining of the shaft material may be increased.

Typically, the goal of a transmission design can be to minimize mass and inertia, so a further problem associated with leaving material in the center of the shaft may be that the mass, and thus the inertia, of the shaft cannot be reduced.

Therefore, what is needed is a way to provide a lightweight shaft design that enables the inclusion of various conduits for the routing of fluids and reduces material and machining costs.

SUMMARY OF THE DISCLOSURE

According to the present disclosure, there is provided a composite shaft including a shaft body and a core insert. The insert material can be selected to have a lower density and/or cost compared with the shaft body material. Moreover, the insert material can be selected for improved machining. The hollow shaft body can have an annular thickness and outside diameter designed to meet the stress and strain requirements of the application. An insert material, such as a light weight polymer is then fitted into the hollow center of the shaft body. The insert can have any necessary fluid conduits formed therein. One aspect of the disclosure may be a reduction in mass, and therefore improved inertial characteristics of the composite shaft. Another aspect may be a reduction in the fabrication cost of the composite shaft.

According to one aspect of the disclosure, a composite shaft for imparting rotation or torque transmission is provided. The composite shaft includes an elongated annular shaft body having an outer surface and defining a hollow cavity. The shaft body has at least one fluid port formed therein. The composite shaft further includes an insert disposed within the hollow cavity of the shaft body. The insert has at least one fluid conduit that aligns with the at least one fluid port. The insert has a material density less than the shaft body.

Another aspect of the disclosure is a composite shaft that includes an elongated annular shaft body and a core insert. The annular shaft body has an outer surface, an inner surface defining a hollow cavity, and at least one fluid port formed between the inner and outer surface. The core insert is disposed within the hollow cavity of the shaft body. The core insert includes an outer surface, an axial fluid conduit extending at least partially between a first end and a second end of the insert, and at least one radial fluid conduit in communication with the axial fluid conduit and the outer surface and aligned with the at least one fluid port. A pin couples the shaft body to the core insert, thereby inhibiting rotation of the core insert relative to the shaft body. In addition, the shaft body is made of a first material and the core insert is made of a second material, and the density of the first material is greater than the density of the second material.

A further aspect of the disclosure is a planetary gear assembly for torque transmission. The planetary gear assembly includes a planetary carrier supporting at least one planetary gear. An elongated annular shaft body couples the planetary gear to the planetary carrier. The shaft body includes an outer surface, an inner surface defining a hollow cavity, and at least one fluid port formed between the inner and outer surface. A core insert is disposed within the hollow cavity of the shaft body. The core insert includes an outer surface, an axial fluid conduit extending at least partially between a first end and a second end of the insert, and at least one radial fluid conduit in communication with the axial fluid conduit and the outer surface and aligned with the at least one fluid port. In addition, the shaft body comprises a first material and the insert comprises a second material, and the density of the first material is greater than the density of the second material.

These and other aspects and advantages of the composite shaft assembly disclosed herein will become better understood upon consideration of the detailed description of the drawings.

BRIEF DESCRIPTION OF THE DRAWINGS

Like reference numerals will be used to refer to like parts from figure to figure in the following detailed description.

DETAILED DESCRIPTION

Figure 1:
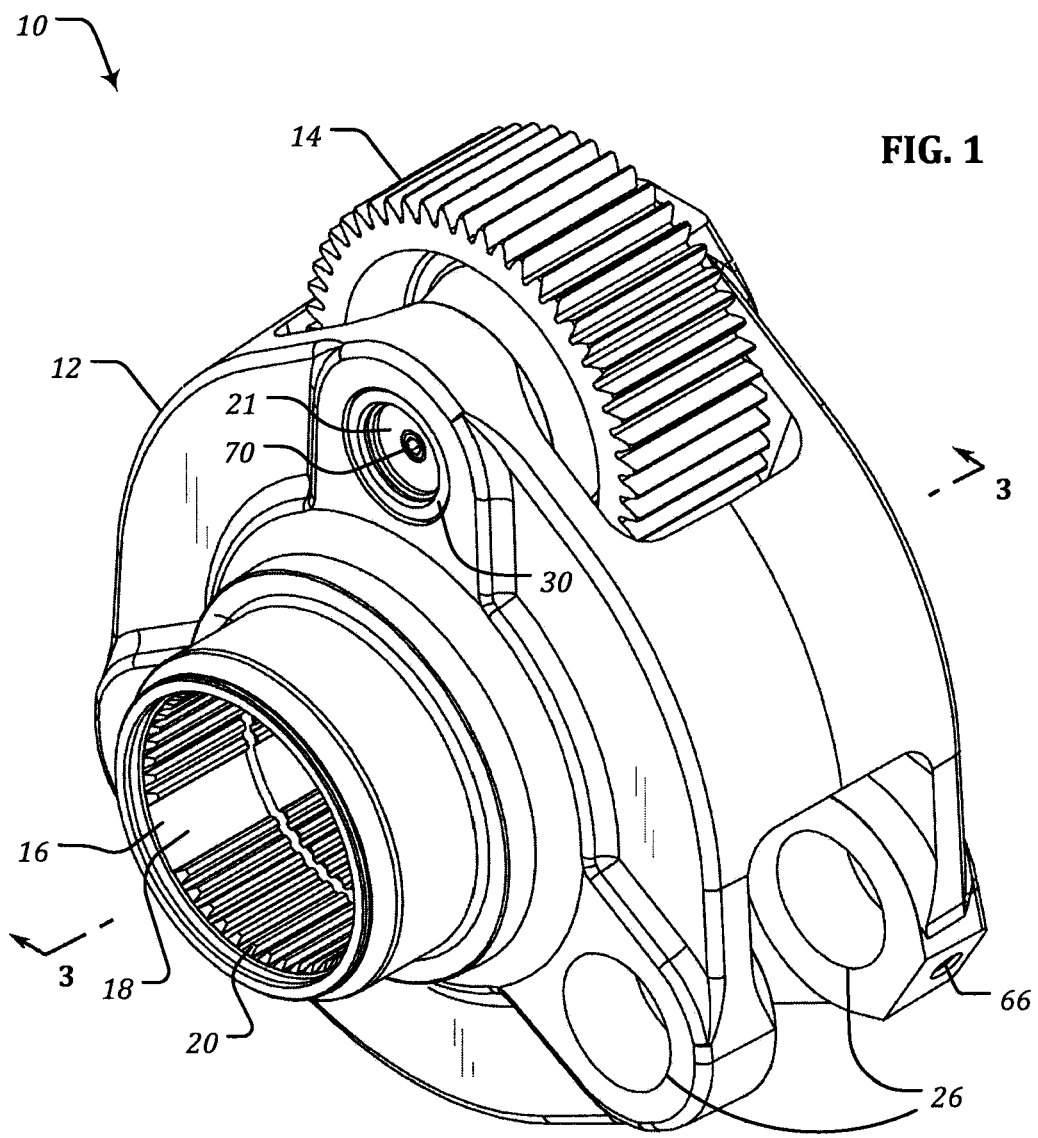
FIG. 1 is a perspective view of an example planetary gear arrangement including a composite shaft in accordance with the present disclosure.

As also discussed above, in various situations it may be useful to provide a suitable arrangement to transmit power from a rotational power source to other components in a mechanical assembly. For example, it may be useful to transmit torque provided by a rotary shaft to a second shaft or a gear, for example in a planetary gear assembly. In order to improve shaft operation for transmission of rotational power, it may be useful to remove a portion of the material at the center of the shaft. Removal of the material at the center of the shaft can reduce the mass and improve the inertial characteristics of the shaft. However, it can also be useful to provide one or more conduits within the shaft to provide a route for fluids such as cooling oil and lubricants that can be required during operation. If the shaft is hollowed out, it may not be possible to provide these fluid conduits. Therefore, a shaft designer may have to choose between providing fluid conduits and minimizing the mass of the shaft. Moreover, the machining steps that are required to provide the conduits may be challenging for certain shaft body materials. For example, a steel shaft may be more difficult to machine than a less dense or lighter weight material. However, a heavier material such as steel may be required to meet the specifications, such as the gross axel weight rating, for the shaft to function properly for a particular application. Various other problems may also arise as the scale, complexity, or other specifications of the shaft are varied.

Use of the disclosed composite shaft with core insert may address these and other issues. For example, for the design of a rotary shaft where it may be useful to both reduce mass and provide conduits for routing of fluids, a composite shaft can be provided. The composite shaft may have a hollow annular shaft body and a core insert housed concentrically within the shaft body. The shaft body can be made of a first material such as steel and the core insert can be selected from a second material with a lower density, such as a polymer. Because the core insert may be less dense than the shaft body, a composite shaft according to the present disclosure may provide a reduction in the overall weight of the shaft as compared with a solid, homogeneous shaft composed of a single material. Moreover, the core insert can be selected for improved machinability as compared with the material selected for the shaft body, for example, to reduce fabrication costs.

One aspect of an example composite shaft according to the present disclosure is that the composite shaft may be used in the context of a planetary gear assembly for a work vehicle. In this case, the composite shaft may support a planetary gear within a planetary carrier. However, any vehicle or other mechanical system may benefit from the use of a composite shaft in place of a solid or hollow shaft, and a planetary gear assembly may not be required to make use of a composite shaft according to the present disclosure. In addition, a composite shaft according to the present disclosure can be configured in any suitable shape and size to effectively transmit a torque or support a rotary part. For example, it may be useful to have a larger or smaller ratio for the radius of the insert to the overall radius of the composite shaft than that shown in the illustrated example. Similarly, while the length of the insert is illustrated as being about equal to the length of the shaft body in the example drawings, the length of the core insert relative to the overall length of the composite shaft can vary. In addition, the cross-section of the core insert may differ from that of the shaft body, with suitable core insert cross-sections including, but not limited to, circles, squares, triangles, hexagons, multi-pointed stars, and other regular polygons.

Multiple composite shafts or multi-layered composite shafts may also be utilized. For example, two or more core inserts can be mounted within a single shaft body. As one example, three concentric layers may make up a composite shaft, with each layer being selecting from a different material. One embodiment of a three layer composite shaft may include a steel shaft body with a first annular polymer insert positioned in the shaft body and a second cylindrical polymer or steel insert positioned within the first polymer insert. It is also possible that multiple core inserts may be arranged as, for example, parallel cylindrical inserts within a single shaft body including multiple parallel passages to receive the inserts.

In general, the present disclosure provides for both fixed and rotary shafts. The core insert disclosed is shown and described as being fixedly mounted to the associated shaft body through the use of a pin, and thus caused to rotate with the shaft body. However, the core insert can be arranged to rotate independently of the shaft body to which it is mounted. Similarly, either or both of the shaft body and core insert can be arranged to rotate independently of a gear or other part associated with the composite shaft.

Referring now to FIG. 1, a schematic illustration of an example implementation of a composite shaft construction is shown. In particular, FIG. 1 shows a planetary gear assembly 10 with various parts omitted for clarity. The planetary gear assembly 10 includes a planetary carrier 12 capable of supporting a number of planetary gears 14. However, for clarity, only one planetary gear 14 is illustrated. The planetary carrier 12 has an axial cylindrical passageway 16 with radially inward splines 20. An axle, drive shaft or the like (not shown) can be received within the passageway 16 and coupled to the splines 20 in order to rotate the planetary gear assembly 10, as will be understood in the art. While not explicitly shown in FIG. 1, the planetary gear assembly can further include additional components such as, but not limited to, a centrally positioned sun gear, a ring gear positioned circumferentially about the planetary gears 14 and a varying number of planetary gears 14. Moreover, while a planetary gear assembly 10 is illustrated for the purposes of providing a context for the composite shaft of the present disclosure, any system or arrangement including a shaft can benefit from the system and methods of the present disclosure. Each of the planetary gears 14 may be coupled to the planetary carrier 12 by a composite shaft 21 that extends through a central opening 24 (shown in FIG. 2) of the planetary gear 14 and into openings 26 in opposing faces of the planetary carrier 12. Fasteners or snap rings 27 can couple the composite shaft 21, and therefore the planetary gear 14, to the planetary carrier 12.

Figure 2:
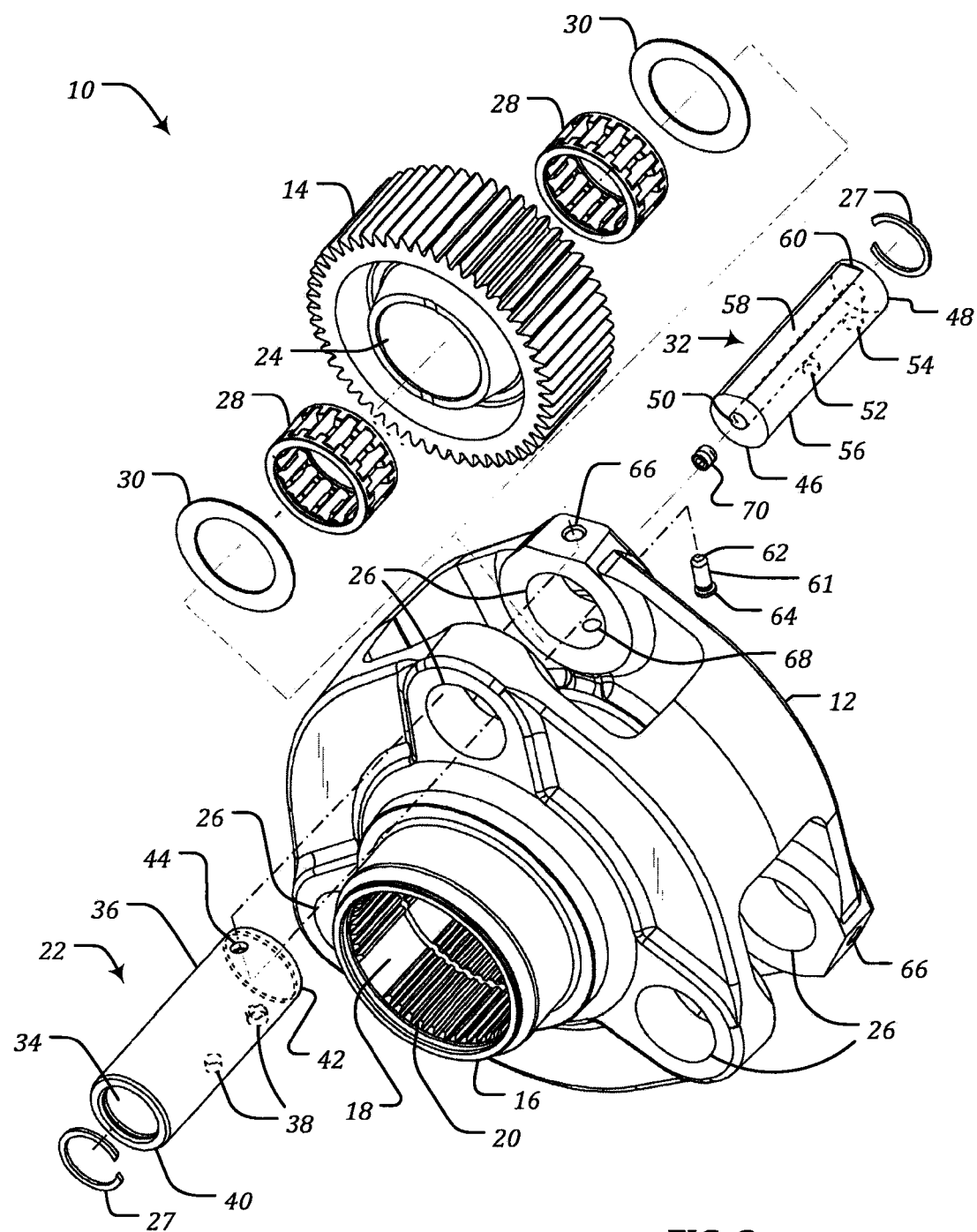
FIG. 2 is an exploded view of some of the components of the planetary gear arrangement of FIG. 1.
Figure 3:
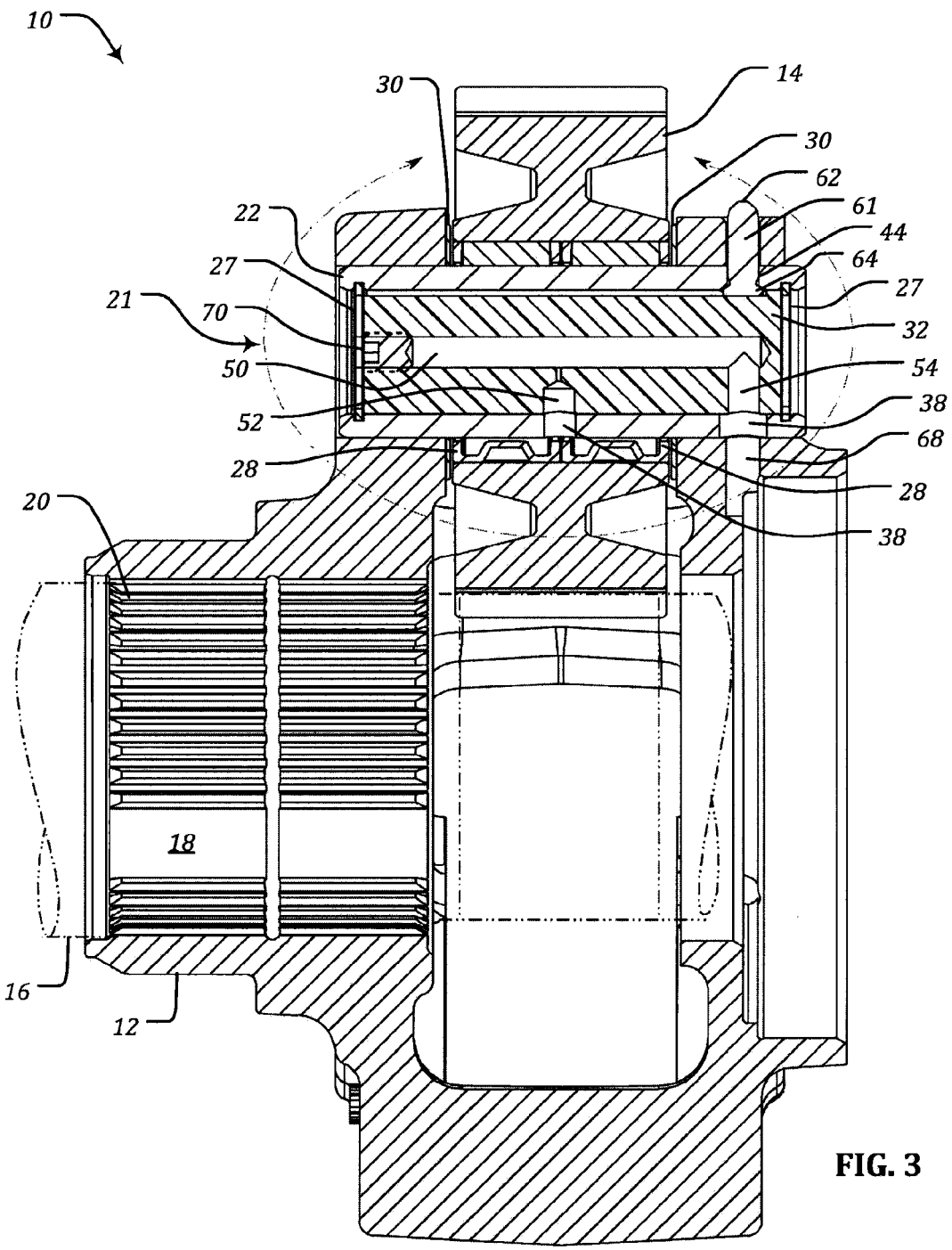
FIG. 3 is a cross-sectional view of the planetary gear arrangement taken along line 3-3 of FIG. 1.
Figure 4:
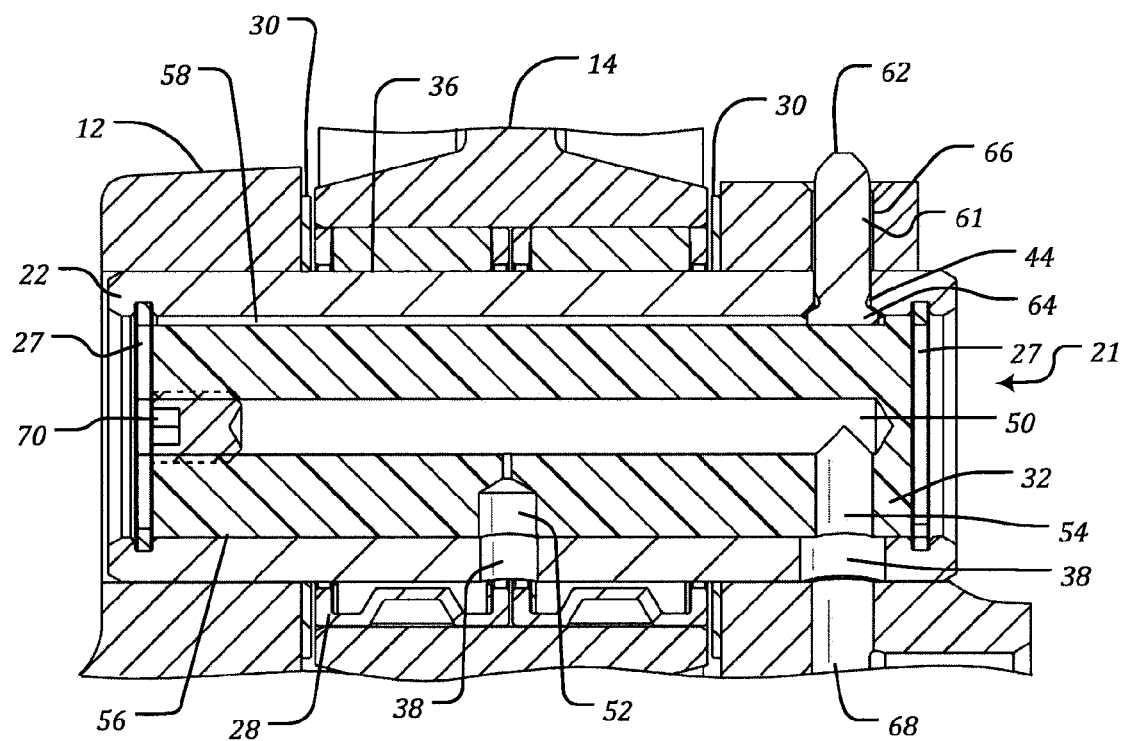
FIG. 4 is an enlarged partial cross-sectional view of the planetary gear arrangement as taken along arc 4-4 of FIG. 3 showing the composite shaft arrangement.

Turning now to FIGS. 2-4, it can be seen that the planetary gear 14 may be positioned coaxially with roller bearings 28 and washers 30 in addition to composite shaft 21 and snap rings 27. FIG. 2 also shows that the composite shaft 21 may include a hollow, annular shaft body 22 and a solid cylindrical core insert 32, which may be disposed in the internal bore or cavity 34 formed in the shaft body 22.

More specifically, the shaft body 22 has a first end 40 and a second end 42. Radial fluid ports 38 may be formed through the shaft body 22 and may open to the surface 36 of the shaft body 22. The radial fluid ports 38 may allow for a fluid such as a lubricant or a coolant to pass between the exterior of the shaft body 22 and the interior of the hollow cavity 34. When the core insert 32 is located within the hollow cavity 34, the radial fluid ports may allow the fluid to access the core insert 32 and any conduits or passages included therein. Any suitable material may be used to form the shaft body 22 in the implementation of the system and methods of the present disclosure. For example, the shaft body 22 can be machined, cast or otherwise formed from steel, aluminum, carbon fiber and the like, and alloys and composites thereof.

The second component of the composite shaft 21 according to the present disclosure is the core insert 32, which may be positioned within the shaft body 22 and may be dimensioned to occupy a substantial portion, or all, of the hollow cavity 34. In one aspect, an outer diameter of the core insert 32 may be substantially equal to an internal diameter of the hollow cavity 34. The core insert 32 can have a first end 46 and a second end 48 that correspond to the respective first 40 and second 42 ends of the shaft body 22. An axial conduit 50 extends from the first end 46 to a point proximal the second end 48 of the core insert 32 and may furthermore be in communication with longitudinally spaced radial conduits 52 and 54, which extend radially outward from axial conduit 50 and are open to an outer surface 56 of the core insert 32. The core insert 32 may also have a longitudinal channel 58 formed in the outer surface 56 that extends from, and opens to, the first end 46 to an intermediate location 60 proximate the second end 48 of the core insert 32. FIGS. 3 and 4 show that the outer surface 56 of the insert 32 may be generally in contact with the inner surface of the cavity 34 along the majority of the length of the shaft body 22. One exception may be that the inclusion of a channel 58, which accommodates a pin 61, may result in a portion of the core insert 32 that is not in contact with the interior of the shaft body 22.

In order to achieve a composite shaft that has a reduced mass as compared with a solid shaft, a lower density material may be selected for the core insert 32. Alternatively, or in addition, a more readily machinable material may be selected such that fluid conduits or other passages may be more readily formed as compared with shaft body materials such as a steel. For example, the core insert 32 can be made of a suitable polymer such as polyethylene, polypropylene, polystyrene, as well as copolymers and composites thereof. Moreover, any suitable method of manufacture can be used to fabricate the core insert 32. In one example, the core insert 32 may be molded or cast into a cylindrical shape, which can then be machined to provide the one or more conduits and ports. In one aspect, the core insert 32 may be cast within the cavity 34 of the shaft body 22. In another example, the conduits are formed as part of the molding or casting process. In general, the assembled composite shaft 21 may include a shaft body 22 with the internally positioned core insert 32, and with the shaft body 22 being of a greater density material than the core insert 32.

In some embodiments, the composite shaft 21 may be able to freely rotate about an axis, while in other embodiments, the angular position of the composite shaft may be fixed. In one aspect, the position of the composite shaft 21 may be fixed in part by providing a passage 44 in the shaft body 22, as shown in FIGS. 2-4. The passage 44 may be open to the surface 36 proximate to the second end 42 of the shaft body 22. Prior to positioning the core insert 32 within the hollow cavity 34, with the shaft body 22 positioned in the planetary carrier 12, a pin 61 may be positioned in the passage 44. The pin 61 includes a first end 62 and a second end 64. The first end 62, which may be chamfered, passes through the passage 44 and may be received in a passage 66 in the planetary carrier 12. The second end 64 of the pin 61 includes an enlarged head dimensioned to fit within the channel 58 in the core insert 32. Thus, when positioning the core insert 32 within the shaft body 22, the channel 58 may be aligned with the second end 64 of the pin 61 and the core insert 32 may be passed telescopically into the hollow cavity 34. During the insertion process, the second end 64 travels along length of the channel 58 until the pin 61 abuts the radial edge wall of the channel at location 60 proximal the second end 48 of the core insert 32.

The pin 61 provides the functionality of fixing the angular position of the core insert 32 relative to both the shaft body 22 and the planetary carrier 12. For example, the planetary carries 12 may be rotated about an axle, drive shaft or the like received within the passageway 16 and coupled to the splines 20. When assembled with the pin 61, the composite shaft 21, including the core insert 32 and the shaft body 22, may be maintained in a fixed angular position relative to the planetary carrier 12 as the planetary carrier 12 is rotated. In particular, the composite shaft 21 may not be able to rotate within openings 26 in opposing faces of the planetary carrier 12. In another aspect, the core insert 32 may not be able to rotate relative to the shaft body 22. However, the planetary gear 14 may be able to rotate about the composite shaft 21, and more particularly, the shaft body 22

The pin 61 may also aid in the alignment of any fluid conduits, ports or passageways included in the design of the composite shaft 21. As shown in FIGS. 3 and 4, alignment of the shaft body 22 with the planetary carrier 12 and the core insert 32 further results in the alignment of the conduits 52 and 54 with the ports 38 and with the passage 68. This alignment can enable a fluid source to communicate with axial conduit 50 to, for example, provide lubrication and/or cooling to components of the planetary gear assembly 10, such as the roller bearings 28.

In the illustrated configuration, radial conduit 54 may be in communication with passage 68, which may in turn be in communication with a source of a fluid such as a coolant or lubricant. As a result, the fluid can be supplied from the source to the axial conduit 50 and radial conduit 52. The fluid may be prevented from exiting with a plug or stop 70 that may be disposed in an end of the conduit 50 proximal the first end 46 of the core insert 32. The stop 70 prevents fluid from exiting the conduit 50 at the first end 46.

FIGS. 3 and 4 also illustrate the location of the pin 61 relative to the planetary carrier 12, shaft body 22 and core insert 32. In particular, it can be seen that the passage 66 in the carrier 12 may be aligned with the passage 44 in the shaft body 22 and the end of the channel 58 proximal to the second end of the core insert 32 in order to accommodate the pin 61. As described previously, the pin 61 impedes rotation of the composite shaft 21 relative to the planetary carrier 12.

It should be noted that in certain embodiments, the pin 61 and channel 58 features can be omitted. For example, the core insert 32 can be fixed relative to the shaft body 22 through the use of an epoxy or other adhesive. Alternatively, various fasteners can be used to couple the core insert 32 to the shaft body 22, such as screws, bolts, rivets and the like, or a compression fit or other friction based installation method can be employed.

Whereas one conduit arrangement is shown in FIGS. 1-4, alternative conduit arrangements can be implemented depending on the arrangement of the particular system or apparatus. In one aspect, the core insert 32 can include no conduits, whereas in another aspect, the core insert 32 can include multiple conduits that are both internal and in communication with the outer surface 56 of the core insert 32. Furthermore, while the conduits shown are generally cylindrical in nature, conduits of any suitable geometry and cross-section can be used, such as conduits having rectangular or other geometric or non-geometric cross-sections.

In addition, both the geometry of the core insert 32 and the shaft body 22 can vary from the generally cylindrical shape depicted in the figures. For example, the core insert 32 and the shaft body 22 can have a non-circular, such as a square, or other geometric or non-geometric, cross-section. The cross-section of the core insert 32 can also be different from that of the shaft body 22, and in still another example, the cross-section of the shaft body 22 or the core insert 32 can vary in the longitudinal direction.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Accordingly, various embodiments and implementations other than those explicitly described are within the scope of the following claims.

What is claimed is:

1. A composite shaft, comprising:
    an elongated annular shaft body having an outer surface and defining a hollow cavity, the shaft body having at least one fluid port formed therein; and
    an insert received by the hollow cavity and having at least one fluid conduit aligned with the at least one fluid port and having an axial channel formed in the outer surface of the insert fluidly separate from the fluid conduit and the fluid port, the channel extending to an opening at an end of the insert; and
    a pin separate from the insert having a substantially cylindrical body and an enlarged head sized greater than the pin body, the head of the pin is received by the channel and the pin body is received by a radial passage formed in the shaft body which is lesser than the channel at least in a dimension normal to the axial and radial dimensions;
    wherein the shaft body has a first density and the insert has a second density less than the first density; and
    wherein the head of the pin enters the channel through the opening at the end of the insert and slides along the channel as the insert is inserted into the hollow cavity of the shaft body and inhibits rotation of the insert relative to the shaft body and separation of the pin from the shaft body.

2. The composite shaft of claim 1, wherein the shaft body and the insert are coaxial.

3. The composite shaft of claim 1, wherein the shaft body is a steel, and wherein the insert is a polymer.

4. The composite shaft of claim 1, wherein the fluid port is in fluid communication with a source of a fluid.

5. The composite shaft of claim 1, wherein the fluid is a one of a coolant and a lubricant.

6. A composite shaft, comprising:
    an elongated annular shaft body including:
        an outer surface;
        an inner surface defining a hollow cavity;
        at least one fluid port formed between the inner and outer surfaces;
        a radial passage formed between the inner and outer surfaces;
    a core insert received by the hollow cavity including:
        an outer surface;
        an axial fluid conduit extending at least partially between a first end and a second end of the insert;
        at least one radial fluid conduit in communication with the axial fluid conduit and the outer surface and aligned with the at least one fluid port;
        an axial channel formed in the outer surface of the core insert fluidly separate from the fluid conduits and the fluid port, the channel extending to an opening at an end of the core insert and the channel being sized larger than the radial passage in the shaft body in at least a dimension normal to the axial and radial dimensions; and
    a pin separate from the core insert coupling the shaft body to the core insert, wherein the pin has a substantially cylindrical body and an enlarged head sized greater than the pin body, the head of the pin is received by the channel and the pin body is received by the radial passage in the shaft body;
    wherein the shaft body is made of a first material and the core insert is made of a second material, wherein the density of the first material is greater than the density of the second material; and
    wherein the head of the pin enters the channel through the opening at the end of the core insert and slides along the channel as the core insert is inserted into the hollow cavity of the shaft body and inhibits rotation of the core insert relative to the shaft body and separation of the pin from the shaft body.

7. The composite shaft of claim 6, wherein the shaft body and the core insert are coaxial.

8. The composite shaft of claim 6, wherein the first material is steel, and wherein the second material is a polymer.

9. The composite shaft of claim 6, wherein the fluid port is in fluid communication with a source of a fluid.

10. The composite shaft of claim 6, wherein the fluid is a one of a coolant and a lubricant.

* * * * *